(No Model.)
E. WHITE.
WATCHMAKER'S COMBINED TWEEZERS AND SCREW DRIVER.
No. 522,640. Patented July 10, 1894.
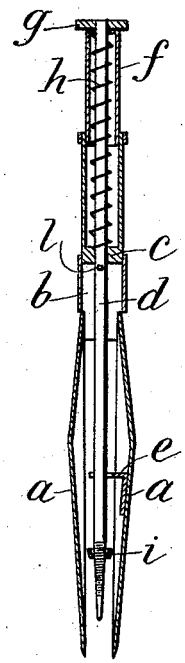
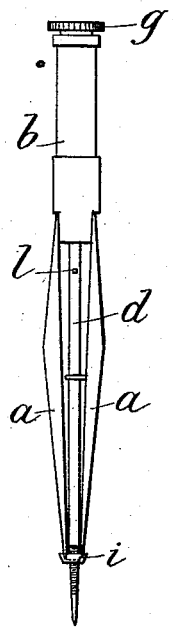
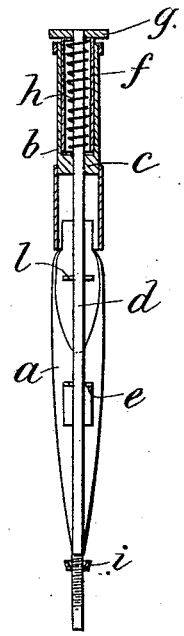
Witnesses
Albert Jones
John F. Gairns
Inventor
Edward White
By his Attorneys
Wheatley & MacKenzie

UNITED STATES PATENT OFFICE.

EDWARD WHITE, OF LOUTH, ENGLAND.

WATCHMAKER'S COMBINED TWEEZERS AND SCREW-DRIVER.

SPECIFICATION forming part of Letters Patent No. 522,640, dated July 10, 1894.

Application filed February 5, 1894. Serial No. 499,190. (No model.)

*To all whom it may concern:*

Be it known that I, EDWARD WHITE, a subject of the Queen of Great Britain and Ireland, residing at Eastgate, Louth, in the county of Lincoln, England, have invented certain new and useful Improvements in Combined Tweezers and Screw-Driver; and I do hereby declare the following to be a full, clear, and exact description of the invention, such as will enable others skilled in the art to which it appertains to make and use the same.

The object of this invention is to provide a combination tool specially adapted for the use of watchmakers, jewelers, and others of similar occupation and comprises a complete pair of tweezers and a perfect screwdriver so combined and constructed that the one does not in any way interfere with the free use of the other.

In the accompanying sheet of illustrative drawings:—Figure 1 represents a vertical section of combined tweezers and screwdriver constructed according to this invention, the tweezers being in an operative position. Fig. 2 is a vertical section showing the screwdriver in an operative position, and Fig. 3 is an elevation of the same.

A pair of tweezer blades $a$ are secured to, or form part of, a tubular casing $b$ having a diaphragm $c$ through which passes the screwdriver $d$ of square or other cross section so as to prevent its turning in the said diaphragm, and being further maintained in a central position by the guide $e$. The upper end of the rod $d$ passes through the end of a tube $f$ and is secured to a disk $g$. The tube $f$ slides freely in the tube $b$ but is normally pressed outwardly by a spring $h$ inclosed by the tubes $b\,f$ and encircling the rod $d$, the extension of the said spring being limited by a stop pin $l$. Secured to the rod $d$ near its point is a disk $i$ formed with an internal conical cup which when the tweezers are in their operative position, is drawn and held up by the spring $h$ between their blades as in Fig. 1, but which when it is desired to place the screwdriver in its operative position, is forced outwardly by pressing the disk $g$ and compressing the spring $h$, the points of the blades $a$ being at the same time pressed together so as to engage when the disk is released in the cup $i$ and prevent the rod from returning to its normal position, and the blades $a$ from springing open as shown in Figs. 2 and 3.

What I claim, and desire to secure by Letters Patent, is—

1. A combined tool comprising a pair of tweezer blades $a$ forming part of the tubular casing $b$, a sliding tube $f$, a spring $h$, a screw driver $d$ sliding through a diaphragm $c$ and being secured to the disk $g$, cup $i$ and guide $e$ all substantially as set forth.

2. The combination of the tweezer blades $a$ and casing $b$ with the screw driver $d$ spring $h$ and cup $i$ substantially as set forth.

In testimony whereof I have affixed my signature in presence of two witnesses.

EDWARD WHITE.

Witnesses:
   C. T. SMITH,
186 *Willingham Street, Gt. Grimsby, Lincolnshire, England, Solicitor's Clerk.*
   PERCY HUDSON,
50 *Carter Gate, Gt. Grimsby, Lincolnshire, England, Solicitor's Clerk.*